United States Patent [19]

Meunier et al.

[11] Patent Number: 4,608,411

[45] Date of Patent: Aug. 26, 1986

[54] GRAFTED ETHYLENE POLYMERS USABLE MORE ESPECIALLY AS ADDITIVES FOR INHIBITING THE DEPOSITION OF PARAFFINS IN CRUDE OILS AND COMPOSITIONS CONTAINING THE OILS AND SAID ADDITIVES

[75] Inventors: Gilles Meunier, Lescar; René Brouard, L'isle Adam; Bernard Damin, Oullins; Denis Lopez, Toulouse, all of France

[73] Assignee: Societe Nationale Elf Aquitaine, Courbevoie, France

[21] Appl. No.: 790,358

[22] Filed: Oct. 23, 1985

[30] Foreign Application Priority Data

Oct. 25, 1985 [FR] France ................... 84 16349

[51] Int. Cl.$^4$ ............. C08L 51/00; C08F 265/04; C08F 263/04
[52] U.S. Cl. ..................... 524/533; 524/531; 525/285; 525/301; 525/304
[58] Field of Search ............... 525/309, 285, 301, 304; 524/533, 531

[56] References Cited

U.S. PATENT DOCUMENTS

| | | | |
|---|---|---|---|
| 3,304,261 | 2/1967 | Ilnckyj et al. | 526/324 |
| 3,341,309 | 9/1967 | Ilnyckyj | 44/62 |
| 3,749,756 | 7/1973 | Kasaka et al. | 525/285 |
| 4,094,927 | 6/1978 | Harrop et al. | 525/221 |

*Primary Examiner*—Carman J. Seccuro
*Attorney, Agent, or Firm*—Burgess, Ryan & Wayne

[57] ABSTRACT

The present invention provides grafted ethylene copolymers usable more especially as additives for inhibiting the depositions in crude oils.

Said copolymer being formed of ethylene and at least one monomer with ethylenic unsaturation, chosen from vinyl esters of $C_2$ to $C_{18}$ monocarboxylic acids, the alkyl esters in the $C_1$ to $C_{12}$ range of unsaturated monocarboxylic acids from the $C_3$ to $C_{12}$ range and the $\alpha, \beta$-unsaturated dicarboxylic compounds, on which are fixed the grafts of a homo or copolymer of an $\alpha, \beta$-unsaturated monocarboxylic acid ester with at least one alkanol of a chain length equal to or greater than $C_{12}$ and at least 20% of which is of a chain length equal to or greater than $C_{22}$. Such copolymers may be used more especially as additives for inhibiting the deposition of paraffins and for improving the flow properties of the crude oils.

16 Claims, No Drawings

GRAFTED ETHYLENE POLYMERS USABLE MORE ESPECIALLY AS ADDITIVES FOR INHIBITING THE DEPOSITION OF PARAFFINS IN CRUDE OILS AND COMPOSITIONS CONTAINING THE OILS AND SAID ADDITIVES

BACKGROUND OF THE INVENTION

1. Field of the Invention

The present invention relates to grafted ethylene copolymers and use thereof as additives for inhibiting the deposition of paraffins and improving the flow properties of crude oils and also relates to the compositions containing the oils and said additives.

Crude oils may contain appreciable paraffin fractions, the amount and exact nature of which are variable depending on the extraction fields. At the temperature of the well the paraffins are liquid and dissolved in the crude oil. When the oil is raised to the surface, its temperature drops and the paraffins, by crystallizing, form a three dimensional network of needles and scales. The result is a loss of fluidity which makes the production, transport, storage and even processing of these oils very difficult. Clogging up of the ducts and processing apparatus is frequent.

2. Description of the Prior Art

Numerous processes have been proposed for resolving this clogging problem, such as mechanical scraping or heating the walls of the ducts or processing apparatus. These processes are costly and use thereof is not always possible.

The use of additives has also been suggested. Polymeric additives whose role is to retard or modify the crystallization of the paraffins and thus to improve the flow properties of the oil and to prevent caking of the crystals formed on the walls are known.

Among the polymeric additives may be mentioned the ethylene-vinyl acetate copolymers, (EVA) described in the French certificate of utility No. 2 184 522 (1972) of Union Oil of California. These polymers have an effect on the starting crystallization temperature of the paraffins but are inefficient for dispersing the crystals already formed. They also have the drawback of being only slightly soluble in the crude oils.

Attempts have been made to improve the efficiency of the EVA copolymers by adding other polymers. Thus, the British Pat. No. 1 112 803 (1966) belonging to ESSO describes the use of a synergic EVA copolymer mixture with polyacrylates.

In order to improve the dispersing effect of these additives as well as their solubility in the crude oils the use of statistical copolymers of ethylene, vinyl acetate and other monomers is recommended. Hereafter we will use the term copolymer for designating the polymers formed from at least two monomers.

Thus the Soviet Pat. No. 785337 (1978) describes ethylene, vinyl acetate and maleic anhydride copolymers. The U.S. Pat. Nos. 3,341,309 (1967) and 3,304,261 (1966) of ESSO recommend the use of ethylene, vinyl acetate and dilauryl or diisodecyl fumarate copolymers. The U.S. Pat. No. 4,160,459 (1977) of TEXACO relates to ethylene, vinyl acetate and alkyl methacrylate copolymers.

However, in these copolymers the monomers are incorporated statistically in the polyethylene chain. The result is a reduction in the length of these chains, which causes a decrease of affinity for the paraffins and adversely affects the efficiency of the product as a crystallization inhibitor.

The present invention overcomes these drawbacks and provides a series of additives having good solubility in crude oils, which have an effect not only on the crystallization of the paraffins but also on the dispersion of the crystals already formed.

SUMMARY OF THE INVENTION

The additives of the invention are readily incorporated in the crude oils. They retard the crystallization of the paraffins, allow the flow point and the viscosity of these oils to be lowered and facilitate the transport, storage and processing thereof.

The additives of the invention are copolymers constituted by a trunk formed from a copolymer of ethylene and at least one monomer with ethylenic unsaturation on which are fixed the grafts of a homo or copolymer of a $\alpha,\beta$ unsaturated monocarboxilic acid esterified with a long chain alkanol.

The structures of the invention have paraffinic sequences not only in the trunk of the polymer coming from the ethylene but also in the graft coming from the $\alpha,\beta$ unsaturated monocarboxylic acid esterified with a long chain alkanol. These paraffinic sequences ensure the affinity of these grafted copolymers with paraffins of the crude oils and improve the solubility of the additive.

The grafted copolymer contains 5 to 95% and preferably 40 to 75% by weight of ethylene copolymer forming the trunk.

The ethylene copolymer contains 50 to 90% and preferably 70 to 90% by weight of ethylene and 1 to 50, preferably 10 to 30% by weight of at least one monomer with ethylenic unsaturation chosen from the group formed by:

vinyl esters from $C_2$ to $C_{18}$ and preferably from $C_2$ to $C_5$ monocarboxylic acids, the $C_1$ to $C_{12}$ alkyl esters of $C_3$ to $C_{12}$ unsaturated monocarboxylic acids, the $\alpha,\beta$-unsaturated dicarboxylic compounds in the form of diacid, $C_1$ to $C_{12}$ alkyl diester or anhydride.

Among the vinyl esters it is preferable to use vinyl acetate.

Among the unsaturated monocarboxylic acid esters it is preferable to use the $C_1$ to $C_{12}$ and preferably $C_1$ to $C_5$ alkyl acrylates or methacrylates.

The $\alpha,\beta$-unsaturated dicarboxylic compounds consist preferably of a methyl, ethyl or propyl diester of maleic, alkyl maleic, fumaric or alkylfumaric acid.

The graft may be a homo or copolymer of an ester of an $\alpha,\beta$-unsaturated monocarboxylic acid with at least one alkanol of a chain length equal to or greater than $C_{12}$ and 20% at least of which is of a chain length equal to or greater than $C_{22}$. As $\alpha,\beta$-unsaturated monocarboxylic acid it is preferable to use acrylic and methacrylic acid.

The esters are are generally obtained by reacting acrylic or methacrylic acid or the esters thereof with mixtures of fatty alcohols.

The fatty alcohols used are mixtures of alcohols having different chain lengths whose distribution is generally in the following limits by weight:

$0 < C_{12}-C_{16} < 10\%$ $0 < C_{16}-C_{18} < 40\%$ $0 < C_{20} < 80\%$ $20 < C_{22}-C_{30} < 100\%$

The preferred alcohol mixture of the invention has the following composition by weight:

$\leq C_{18}$: 0 to 30%
$C_{20}$: 10 to 70%
$C_{22}-C_{30}$: 20 to 90%

If the graft is a copolymer, it contains 20 to 99% and preferably 60 to 99% by weight of the ester of an $\alpha,\beta$-unsaturated monocarboxylic acid with an alkanol having at least twelve carbon atoms in its molecule and at least one comonomer chosen from the group formed by:

The monomers of the general formula

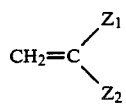

in which $Z_1$ and $Z_2$, identical or different, represent hydrogen, a halogen, a $C_1$ to $C_{30}$ saturated, unsaturated or aromatic hydrocarbon radical, a group

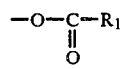

where $R_1$ is a $C_1$ to $C_5$ alkyl radical or a group $-OR_2$ where $R_2$ is a $C_1$ to $C_{12}$ alkyl radical, the unsaturated $\alpha,\beta$-dicarboxylic compounds in the form of diacid, light alkyl diester or anhydride.

Among the comonomers of the general formula

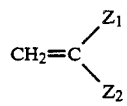

those are preferred in which $Z_1$ represents a hydrogen and $Z_2$ represents a $C_1$ to $C_{18}$ alkyl radical, a $C_6$ to $C_{12}$ aromatic radical, a group

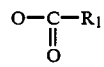

where $R_1$ is a $C_1$ to $C_3$ alkyl radical or a group $-OR_2$ where $R_2$ is a $C_1$ to $C_6$ alkyl radical.

The preferred comonomers are octadecene, styrene and vinyl acetate. They also facilitate copolymerization of the $\alpha,\beta$-unsaturated monocarboxylic acid esters and particularly of the acrylates or methacrylates with the $\alpha,\beta$-unsaturated dicarboxylic compounds.

Among the $\alpha,\beta$-unsaturated dicarboxylic compound entering in the composition of the grafts may be mentioned maleic or alkyl maleic acid, a methyl, ethyl or propyl diester of such an acid or a maleic or alkyl maleic anhydride.

The grafted copolymers are obtained by grafting the alkyl ester of an unsaturated monocarboxylic acid and possibly of the other monomers mentioned on the ethylene copolymer dissolved in an organic solvent. A solvent is chosen in which not only this polymer but also the monomer or monomers to be grafted are soluble. Among such solvents may be mentioned the hydrocarbonated solvents with aliphatic or aromatic structure, chemically inert with respect to the monomers.

Preferred solvents are for example xylene or toluene or a fraction with aromatic character.

The overall monomer concentration can vary from 10 to 100% by weight of the solvent, the preferred concentrations going from 20 to 60% so as to have, after polymerization, a solution which is pumpable at a temperature close to the ambient temperature. The polymerization temperature may vary fairly wide, for example between 50° and 150° C. and preferably between 70° and 120° C.

The pressure is chosen depending on the structure of the monomers, it may vary between atmospheric pressure and high pressures of the order of 100 bars.

The catalysts are generally chosen from the free radical generating compounds soluble in the reaction medium such for example as peroxides such as benzoyl, acetyl, peroxide, ditertiobutyl peroxide, tertiary butyl peroctoate or the azo compounds such for example as azo-bis-isobutyronitrile. In general $10^{-5}$ to $10^{-1}$ and preferably $5.10^{-4}$ to $10^{-2}$ moles of catalyst are used per mole of monomer.

The degree of polymerization is measured by gel permeation chromatography which allows the molecular mass by weight as equivalent number of polystyrene and polydispersity index of the polymer to be attained. An estimate of the grafting degree may be obtained from the molecular mass increase obtained by GPC.

The molecular mass of the final polymer may vary from 5000 to 300 000 and preferably from 20.000 to 150.000.

Only a very small percentage of non grafted polymer is formed, this percentage varying with the composition of the starting mixtures. Because of the compatibilizing effect of the grafted polymer, this polymer forms a stable mixture with the ethylene copolymer.

The additive of the invention is incorporated in the crude oils in a weight concentration going from 5 to 4000 ppm and preferably from 100 to 1500 ppm. Incorporation can be effected 20° above the flow point of the crude oil, with agitation.

EXAMPLES

Examples 1 to 5 describe the grafting of variable amounts of polyacrylates on an EVA copolymer, whereas example 7 relates to the grafting of three monomers, alkyl acrylate, styrene and maleic anhydride on the same copolymer. In the examples 6 and 8 by way of comparison alkyl polyacrylate and an alkyl acrylate-styrene-maleic anhydride copolymer were prepared.

Example 9 describes the synthesis by way of comparison of a grafted EVA by an alkyl acrylate not comprising any $C_{22}$ alkyl.

Examples 10 to 12 relate to the grafting on trunks formed by the terpolymers.

The yield indicates the percentage of monomers which reacted with respect to the starting monomer. We also show the percentage of grafted copolymer present in the final polymer. This percentage is estimated from the chromatogram obtained by gel permeation chromatography by working out the ratio of the areas corresponding to the peak of the small masses (non grafted product) and to the peak of the highest masses (grafted copolymer) and from the composition of the starting mixture. The top molecular mass (M) corresponds to the peak recorded with GPC, it is given by way of indication for showing the increase of the molecular mass due to grafting.

EXAMPLE 1

In a 1 liter reactor are introduced with stirring 60 g (1.36 mole) of an ethylene-vinyl acetate (EVA) copolymer (Mw=28,000, Mn=18,000, M=50,000) comprising 28% by weight of vinyl acetate in 440 g of xylene, the reactor having been placed beforehand under a nitrogen atmosphere. The mixture was heated to 90° C. before obtaining dissolution of the copolymer. Then 6.67 g of alkyl acrylate of a mean chain length $C_{20}$–$C_{22}$ comprising 70% at $C_{22}$ were added then after total dissolution of the alkyl acrylate, 0.136 g of tertiary butyl peroctoate was added. After reaction times of one hour, two hours and three hours, the same amounts of radical primer were added to the reaction so that the total amount of catalyst used was 0.544 g. The total polymerization time was 4 hours.

Yield=92% of which grafted copolymer=94%
M=55,000.

EXAMPLE 2

The same operating conditions as those described in Example 1 were repeated but using 20 g of alkyl acrylate and 0.408 g of tertiary butyl peroctoate.

Yield=91% of which grafted copolymer=85%.
M=65,000.

EXAMPLE 3

The same operating conditions as those described in Example 1 were repeated but using 30 g of alkyl acrylate and 0.625 g of tertiary butyl peroctoate.

Yield=93% of which grafted copolymer=74%.
M=80,000.

EXAMPLE 4

The same operating conditions as those described in Example 1 were repeated but using 60 g of alkyl acrylate and 1.225 g of tertiary butyl peroctoate.

Yield=94% of which grafted copolymer=54%.
M=85,000.

EXAMPLE 5

The same operating conditions as those described in Example 1 were repeated but using 60 g of alkyl acrylate and 1.836 g of tertiary butyl peroctoate.

Yield=89% of which grafted copolymer=46%.
M=85,000.

EXAMPLE 6

By way of comparison the alkyl acrylate was polymerized under the conditions described in Example 1, without the presence of the EVA copolymer.

Yield=93%.
Mn=12,000.

EXAMPLE 7

The same operating conditions as those described in Example 1 were repeated but using a mixture of 3 monomers, 53.36 g of alkyl acrylate, 2 g of styrene and 1.89 g of maleic anhydride in the presence of 0.86 g of butyl peroctoate.

Yield=88% of which grafted copolymer=54%
M=84,000.

EXAMPLE 8

By way of comparison the alkyl acrylate, the styrene and the maleic anhydride were polymerized under conditions described for Example 7 but in the presence of the EVA copolymers.

Yield=89%.
Mn=10,500.

EXAMPLE 9

The same operating conditions as those described in Example 1 were repeated but using a $C_{18}$ to $C_{20}$ alkyl acrylate, not comprising any $C_{22}$.

Yield=93% of which grafted copolymer=53%.
M=85,000.

EXAMPLE 10

The same operating conditions as those described in Example 1 were repeated but substituting the ethylene-vinyl acetate copolymer by an ethylene-vinyl acetate-maleic anhydride terpolymer (Mw=26000, Mn=15000, M=40000) comprising 28% by weight of vinyl acetate and 1% of maleic anhydride and using 60 g of alkyl acrylate and 1.83 g of tertiary butyl peroctoate. The alkyl acrylate was in the range $C_{18}$–$C_{22}$ and contained 70% of $C_{22}$.

Yield=90% of which grafted copolymer=49%
M=80,000.

EXAMPLE 11

The same operating conditions as those described in Example 1 were repeated but substituting the ethylene-vinyl acetate copolymer by an ethylene-vinyl acetate-dilauryl fumarate terpolymer (M=38,000) prepared in accordance with the synthesis method described in the U.S. Pat. No. 3,341,309 and using 60 g of alkyl acrylate and 1.836 g of tertiary butyl peroctoate. The alkyl acrylate was in the range $C_{18}$–$C_{22}$ and contained 70% of $C_{22}$.

Yield=90° of which grafted copolymer=47%.
M=78,000.

EXAMPLE 12

The same operating conditions as those described in Example 1 were repeated but substituting the ethylene-vinyl acetate copolymer by an ethylene-vinyl acetate-$C_{12}$ alkyl methacrylate terpolymer prepared in accordance with the synthesis method described in U.S. Pat. No. 4,160,459 and using 60 g of alkyl acrylate and 1.836 g of tertiary butyl peroctoate. The alkyl acrylate was in the $C_{18}$–$C_{22}$ range and contained 70% of $C_{22}$.

Yield=89% of which grafted copolymer=45%.
M=85,000.

To determine the efficiency of these polymers as paraffin deposition inhibitors two different measurements were used:

the flow point in accordance with the standard ASTM D 97 B, the starting crystallization temperature of the paraffins, by differential calorimetric analysis described in Thermochimica Acta 70 7 (1983).

This measurement allows the temperature at which the first paraffin crystals appear to be determined very accurately.

The results were obtained from comparing the starting crystallization temperatures of the untreated crude oils and those of the crude oils containing the additives of the invention.

The magnitude ΔT representative of the efficiency of the additives is defined by the relationship:

$$\Delta T = T_1 - T_2$$

where
- $T_1$ = starting crystallization temperature of the untreated crude oil,
- $T_2$ = starting crystallization temperature of the crude oil in the presence of additives.

For certain crude oils there exist two starting crystallization temperatures, one concerns the heavy paraffins, higher than $C_{45}$, the other the lighter paraffins lower than $C_{45}$.

Tables 2 to 5 give the starting crystallization temperatures or the flow point of the different original crude oils in the presence of variable additive concentrations.

In addition, an "in the field" test at the well of the Gabonese crude oil, the use of 30 ppm of the additive of example 4 allowed this crude oil to be produced and transported through ducts over a distance of 15 km without any problem of viscosity or deposition of paraffins;

Table 1 contains the characteristics of the crude oil tested.

The paraffin content of the crude oils is determined by gas chromatography. The viscosity is measured in a RHEOMAT 30 apparatus. At the temperature of the measurement, the crude oil behaved like a Newtonian liquid.

TABLE I

| Characteristics of the crude oils tested | | | |
|---|---|---|---|
| Origin | Gabon | Niger | Tunisia |
| Voluminal Mass kg/m³ 15° C. | 852 | 843 | 878 |
| Flow point | 18 | 24 | 3 |
| Paraffin content | 15 | 8 | 10.4 |
| Viscosity (cps) | 40° C. 8.6 | 50° C. 6.7 | 20° C. = 48.3 |
|  | 60° C. 5.9 | 60° C. 5.3 | 40° C. = 8.6 |

TABLE 2

CRUDE OIL OF GABONESE ORIGIN STARTING CRYSTALLIZATION TEMPERATURES

$T_1$ heavy paraffins = 38.3° C.
$T_2$ light paraffins = 21.9° C.
Additive concentration = 400 ppm

| | Heavy paraffins | | Light paraffins | |
|---|---|---|---|---|
| | $T_2$(°C.) | ΔT(°C.) | $T_2$(°C.) | ΔT(°C.) |
| Product ex. VI (comparison) | 38.3 | 0 | 19.8 | 2.1 |
| Ethylene/vinyl acetate copolymer (comparison) | 34.1 | 4.2 | 21.4 | 0.5 |
| Mixture (50/50) ethylene/vinyl acetate copolymer + product ex. VI (comparison) | 33.5 | 4.8 | 20.7 | 1.2 |
| Product ex. I | 33.4 | 4.9 | 20.9 | 1.0 |
| Product ex. II | 33.3 | 5.0 | 20.3 | 1.6 |
| Product ex. III | 32.8 | 5.5 | 19.9 | 2 |
| Product ex. IV | 32.5 | 5.8 | 19.8 | 2.1 |
| Product ex. V | 32.9 | 5.4 | 19.3 | 2.6 |
| Product ex. VIII (comparison) | 38.3 | 0 | 19.9 | 2.0 |
| Product ex. VII | 33.5 | 4.8 | 19.8 | 2.1 |
| Product ex. IX (comparison) | 34.1 | 4.2 | 20.5 | 1.4 |
| Product ex. X | 32.7 | 5.6 | 19.8 | 2.1 |
| Product ex. XI | 32.9 | 5.4 | 19.1 | 2.8 |
| Product ex. XII | 33.0 | 5.3 | 19.2 | 2.7 |

TABLE 3

CRUDE OIL OF TUNISIAN ORIGIN STARTING CRYSTALLIZATION TEMPERATURE

$T_1$ = 28.3° C.

| | ΔT °C. | | |
|---|---|---|---|
| Additive in ppm | 250 | 500 | 700 |
| Ethylene-vinyl acetate copolymer (comparison) | +1.5 | 3.0 | 3.6 |
| Product ex. VI (comparison) | 0 | 0 | 0 |
| Product ex. VII (comparison) | 0 | 0 | 0 |
| Mixture (50/50) ethylene-vinyl acetate copolymer + product ex. VI (comparison) | +1.5 | +2.1 | +3.4 |
| Product ex. V | +2.3 | +4.4 | +5.3 |
| Product ex. VII | +2 | +3.6 | +4.6 |
| Product ex. IX (comparison) | +1.5 | +2.3 | +3.6 |
| Product ex. X | +2.3 | +3.7 | +5.1 |
| Product ex. IX | +2.5 | +4.6 | +5.4 |
| Product ex. XII | +2.5 | +4.7 | +5.5 |

TABLE 4

CRUDE OIL OF NIGERIAN ORIGIN STARTING CRYSTALLIZATION TEMPERATURE

$T_1$ = 28.5° C.

| | ΔT °C. | | | |
|---|---|---|---|---|
| Additive in ppm | 60 | 120 | 200 | 400 |
| Ethylene-vinyl acetate copolymer (comparison) | 0 | 0 | 0 | 0.1 |
| Product ex. VI (comparison) | 0 | 0 | 2.1 | 2.1 |
| Mixture (50/50) ethylene-vinyl acetate copolymer + product ex. VI (comparison) | 0.5 | 1.1 | 1.4 | 1.6 |
| Product ex. V | 1.8 | 2.4 | 2 | 1 |
| Product ex. IX (comparison) | 0 | 0.3 | 0.5 | 0.7 |
| Product ex. X | 1.3 | 1.9 | 2.1 | 2.3 |
| Product ex. XII | 1.9 | 2.5 | 2.2 | 2.0 |
| Product ex. XII | 1.8 | 2.0 | 2.1 | 2.2 |

TABLE 5

CRUDE OIL OF NIGERIAN ORIGIN FLOW POINT (°C.)

| | | | | |
|---|---|---|---|---|
| Additive in ppm | 0 | 20 | 40 | 80 |
| Ethylene-vinyl acetate copolymer (comparison) | +24 | +24 | +12 | 0 |
| Product example VI (comparison) | +24 | 24 | +9 | 0 |
| Mixture (50/50) ethylene/vinyl acetate copolymer + product ex. VI | +24 | 24 | 6 | 0 |
| Product ex. V | +24 | 21 | 0 | −3 |
| Product ex. IX (comparison) | +24 | +24 | +12 | +3 |
| Product ex. X | +24 | +21 | −3 | −3 |
| Product ex. XI | +24 | +21 | 0 | −3 |
| Product ex. XII | +24 | +21 | +3 | 0 |

What is claimed is:

1. A grafted copolymer additive for inhibiting the deposition of paraffins and improving the flow properties of crude oils which comprises a copolymer of ethylene with at least one ethylenically unsaturated monomer selected from the group consisting of:

vinyl esters of $C_2$ to $C_{18}$ monocarboxylic acids, $C_1$ to $C_{12}$ alkyl esters of $C_3$ to $C_{12}$ unsaturated monocarboxylic acids, α,β-unsaturated dicarboxylic acids, $C_1$ to $C_{12}$ alkyl diesters of α,β-unsaturated dicarboxylic acids and anhydrides of α,β-unsaturated dicarboxylic acids having grafted thereto a homopolymer or copolymer of an ester of an α,β-unsaturated monocarboxylic acid with at least one alkanol having a chain length of at least $C_{12}$ and wherein at least 20% of said alkanol has a chain length of at least $C_{22}$, said ethylene copolymer being from about 50 to 95% by weight of the grafted copolymer.

2. The grafted copolymer as claimed in claim 1, containing 40 to 75% by weight of ethylene copolymer.

3. The grafted copolymer as claimed in claim 1, wherein the vinyl ester is a vinylester of a $C_2$ to $C_5$ monocarboxylic acid.

4. The grafted copolymer as claimed in claim 1, wherein the unsaturated monocarboxylic acid alkyl ester is a $C_1$ to $C_{12}$ ester of acrylic or methacrylic acid.

5. A grafted copolymer of claim 1, wherein the $\alpha,\beta$-unsaturated dicarboxylic acid ester comprises at least one diester selected from the group consisting of methyl, ethyl or propyl esters of maleic, alkylmaleic, fumaric and alkyl fumaric acid.

6. The grafted copolymer as claimed in claim 1, wherein the ethylene copolymer contains 50 to 90% by weight of ethylene.

7. The grafted copolymer as claimed in claim 1, wherein the graft polymer is a homopolymer of an $\alpha,\beta$-unsaturated monocarboxylic acid ester.

8. The grafted copolymer as claimed in claim 7, wherein the $\alpha,\beta$-unsaturated monocarboxylic acid ester is at least one acrylic or methacrylic acid ester.

9. The grafted copolymer as claimed in claim 1, wherein the graft polymer contains 20 to 99% by weight of an ester of an $\alpha,\beta$-unsaturated monocarboxylic acid and at least one comonomer selected from the group consisting of:

(a) monomers of the general formula

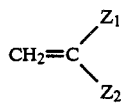

in which $Z_1$ and $Z_2$ can be identical or different and represent hydrogen, a halogen, a saturated hydrocarbon, unsaturated hydrocarbon, or aromatic hydrocarbon radical having from 1 to 30 carbon atoms, a group

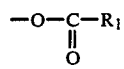

where $R_1$ is an alkyl radical having from 1 to 5 carbon atoms or a group $—OR_2$ where $R_2$ is a $C_1$ to $C_{12}$ alkyl radical, and (B) an $\alpha,\beta$-unsaturated dicarboxylic acid in the form of diacid, lower alkyl diester or anhydride.

10. The grafted copolymer as claimed in claim 9, wherein the ethylenically unsaturated monomer comprises at least one member selected from the group consisting of maleic acid, alkylmaleic acid, dimethyl ester of maleic acid, diethyl ester of maleic acid, dipropyl ester of maleic acid, dimethyl ester of alkyl maleic acid, diethyl ester of alkyl maleic acid, dipropyl ester of alkyl maleic acid, maleic anhydride or alkyl maleic anhydride.

11. A grafted copolymer as claimed in claim 9, wherein in the comonomers of the general formula

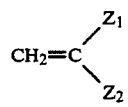

$Z_1$ represents hydrogen and $Z_2$ represents a $C_1$ to $C_{18}$ alkyl radical, a $C_6$ to $C_{12}$ aromatic radical, a group

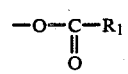

where $R_1$ is a $C_1$ to $C_3$ alkyl radical, or a group $—OR_2$ where $R_2$ is a $C_1$ to $C_6$ alkyl radical.

12. The grafted copolymer as claimed in claim 11, wherein the comonomer or comonomers are chosen from octadecene, styrene and vinyl acetate.

13. The grafted copolymer as claimed in claim 9, wherein the $\alpha,\beta$-unsaturated monocarboxylic acid is an acrylic or methacrylic acid.

14. A composition comprising a crude oil and a grafted copolymer as claimed in claim 1.

15. The composition as claimed in claim 14, wherein the grafted copolymer is present at a concentration by weight of from about 5 to 4000 ppm.

16. The composition of claim 15 wherein the grafted copolymer is present at a concentration by weight of from about 100 to 1500 ppm.

* * * * *